United States Patent
Johnson et al.

(10) Patent No.: US 7,054,853 B2
(45) Date of Patent: May 30, 2006

(54) METHODS AND SYSTEM FOR EFFICIENT ASSOCIATION TRAVERSALS

(75) Inventors: Thomas V. Johnson, Burlington, MA (US); Zane Zheng Yan Pan, Lexington, MA (US); Charles C. Ting, Wayland, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 697 days.

(21) Appl. No.: 09/895,077

(22) Filed: Jul. 2, 2001

(65) Prior Publication Data

US 2003/0004956 A1    Jan. 2, 2003

(51) Int. Cl.
    *G06F 17/30* (2006.01)
(52) U.S. Cl. .................................... 707/2; 707/103
(58) Field of Classification Search ........ 707/100–103, 707/103 R, 2; 717/101, 109
    See application file for complete search history.

(56) References Cited

U.S. PATENT DOCUMENTS

| | | | | |
|---|---|---|---|---|
| 5,133,068 A | * | 7/1992 | Crus et al. .................. 707/100 |
| 5,862,379 A | * | 1/1999 | Rubin et al. ................. 717/109 |
| 5,872,973 A | * | 2/1999 | Mitchell et al. ............. 719/332 |
| 5,937,189 A | * | 8/1999 | Branson et al. ............. 717/101 |
| 6,182,136 B1 | * | 1/2001 | Ramanathan et al. ....... 709/224 |
| 6,493,719 B1 | * | 12/2002 | Booth et al. ............ 707/103 X |
| 2002/0165727 A1 | * | 11/2002 | Greene et al. .................. 705/1 |
| 2002/0173984 A1 | * | 11/2002 | Robertson et al. ............. 705/1 |
| 2002/0178026 A1 | * | 11/2002 | Robertson et al. ............. 705/1 |
| 2003/0004774 A1 | * | 1/2003 | Greene et al. .................. 705/8 |
| 2003/0037177 A1 | * | 2/2003 | Sutton et al. ............... 709/316 |

* cited by examiner

*Primary Examiner*—Safet Metjahic
*Assistant Examiner*—Brian Goddard
(74) *Attorney, Agent, or Firm*—Finnegan, Henderson, Farabow, Garrett & Dunner, L.L.P.

(57) ABSTRACT

Methods and systems are provided for performing efficient association traversal operations in a Common Information Model (CIM) implemented environment. A CIM Object Manager creates and defines instance objects and corresponding association objects in a repository. The CIM Object Manager creates wrappers for each object that include reverse links that show the relationship from an object to any corresponding association objects. When a relationship request for a selected object is received by the CIM Object Manager, it performs an association traversal operation using the reverse links stored in the repository. The CIM Object Manager locates the target object's wrapper in the repository, and collects relationship information from the reverse links included within the wrapper. The collected relationship information is then passed to the entity that initiated the request. Accordingly, efficient association traversals may be performed, without having to traverse each instance of defined association objects.

40 Claims, 16 Drawing Sheets

FIG. 5B

Instance 1 Wrapper Table

| ASSOCIATION NAME | TO INSTANCE |
|---|---|
| A-1 | I-5 |
| A-2 | I-2 |
| A-3 | I-3 |
| A-4 | I-4 |

Instance 2 Wrapper Table

| ASSOCIATION NAME | TO INSTANCE |
|---|---|
| A-2 | I-2 |

Instance 3 Wrapper Table

| ASSOCIATION NAME | TO INSTANCE |
|---|---|
| A-3 | I-1 |

Instance 4 Wrapper Table

| ASSOCIATION NAME | TO INSTANCE |
|---|---|
| A-4 | I-1 |

Instance 5 Wrapper Table

| ASSOCIATION NAME | TO INSTANCE |
|---|---|
| A-1 | I-1 |

REPOSITORY 350

INSTANCE 1 WRAPPER TABLE

| ASSOCIATION NAME | TO INSTANCE |
|---|---|
| A-1 | I-5 |
| A-2 | I-2 |
| A-3 | I-3 |
| A-4 | I-4 |

INSTANCE 2 WRAPPER TABLE

| ASSOCIATION NAME | TO INSTANCE |
|---|---|
| A-2 | I-2 |

INSTANCE 3 WRAPPER TABLE

| ASSOCIATION NAME | TO INSTANCE |
|---|---|
| A-3 | I-1 |

INSTANCE 4 WRAPPER TABLE

| ASSOCIATION NAME | TO INSTANCE |
|---|---|
| A-4 | I-1 |

INSTANCE 5 WRAPPER TABLE

| ASSOCIATION NAME | TO INSTANCE |
|---|---|
| A-1 | I-1 |

INSTANCE 6 WRAPPER TABLE

| ASSOCIATION NAME | TO INSTANCE |
|---|---|
| | |

INSTANCE 7 WRAPPER TABLE

| ASSOCIATION NAME | TO INSTANCE |
|---|---|
| | |

REPOSITORY 350

Instance 1 Wrapper Table

| ASSOCIATION NAME | TO INSTANCE |
|---|---|
| A-1 | I-5 |
| A-2 | I-2 |
| A-3 | I-3 |
| A-4 | I-4 |

Instance 2 Wrapper Table

| ASSOCIATION NAME | TO INSTANCE |
|---|---|
| A-2 | I-2 |

Instance 3 Wrapper Table

| ASSOCIATION NAME | TO INSTANCE |
|---|---|
| A-3 | I-1 |

Instance 4 Wrapper Table

| ASSOCIATION NAME | TO INSTANCE |
|---|---|
| A-4 | I-1 |
| A-6 | I-6 |

Instance 5 Wrapper Table

| ASSOCIATION NAME | TO INSTANCE |
|---|---|
| A-1 | I-1 |
| A-5 | I-7 |

Instance 6 Wrapper Table

| ASSOCIATION NAME | TO INSTANCE |
|---|---|
| A-6 | I-4 |

Instance 7 Wrapper Table

| ASSOCIATION NAME | TO INSTANCE |
|---|---|
| A-5 | I-5 |

REPOSITORY 350

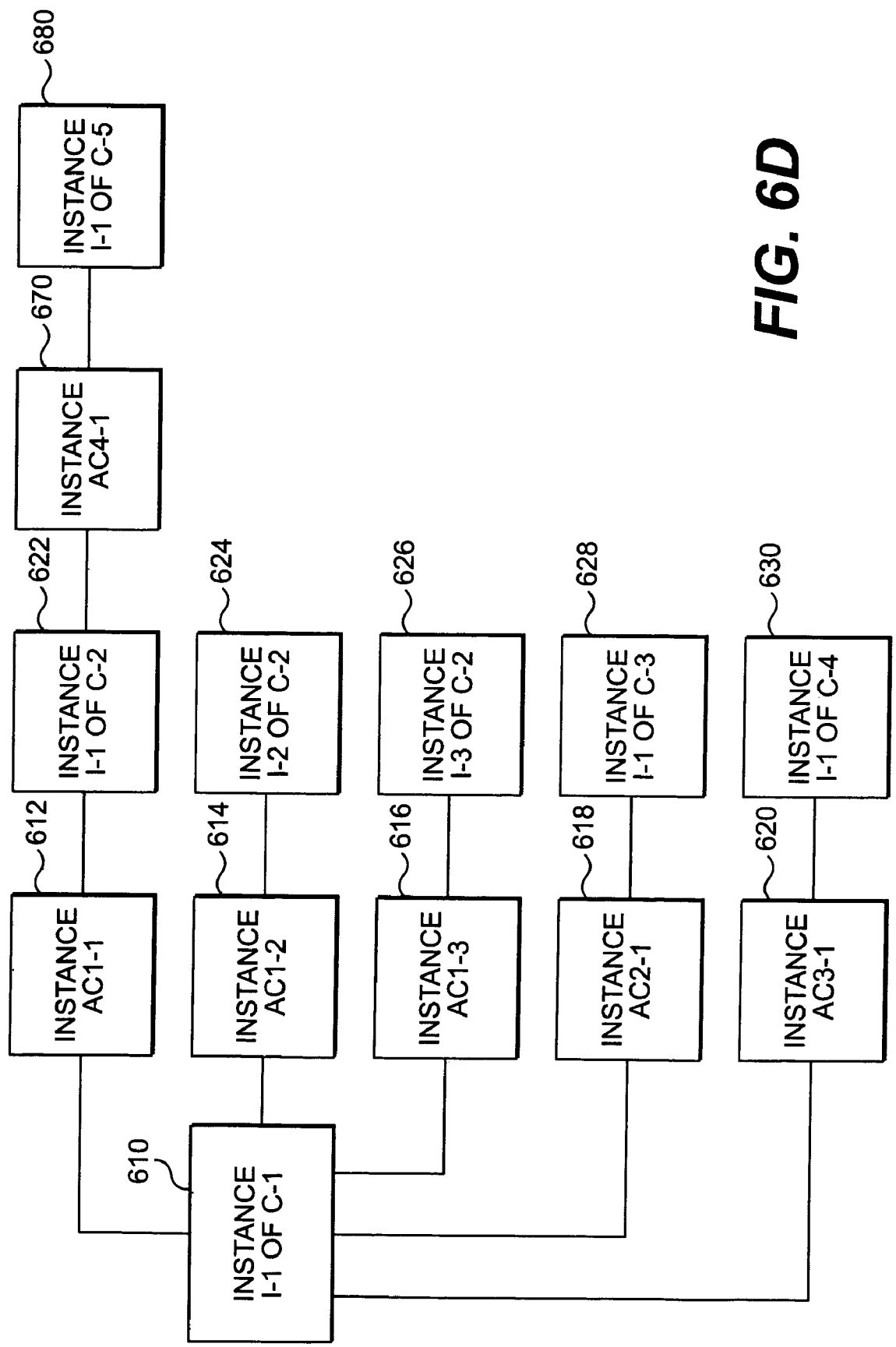

METHODS AND SYSTEM FOR EFFICIENT ASSOCIATION TRAVERSALS

DESCRIPTION OF THE INVENTION

1. Field of the Invention

This invention relates to Common Information Model (CIM) environments and, more particularly, to methods and systems for performing efficient association traversals.

2. Background of the Invention

The Common Information Model (CIM) is a common data model of a schema for describing the management of information in a network environment. The model is not bound to a particular implementation and enables distributed system management to take place between management systems and applications. The CIM enables applications to be built using management data from a plurality of management systems.

A CIM typically consists of two parts, a CIM specification and a CIM schema. The CIM specification describes the language, naming and mapping to other management models, while the CIM schema provides the model descriptions. The CIM schema includes a set of classes with properties and associations that are used to organize information about a managed system. The CIM schema is separated into three layers: a core model; a common model; and an extension schema.

The core model contains a set of classes that are associated with a plurality of management domains. The common model is a model having a lower level than the core model, and provides base classes that are associated with certain management areas, yet not specific to a particular technology. The base classes allow for extensions into specific areas of technology. The extension schema defines technology specific extensions to the common model.

The CIM is based on object-oriented modeling techniques. The Unified Modeling Language (UML) is generally used to construct an object oriented model. An exemplary model including UML representations is presented in FIG. 1. As shown, a class 110 may have properties 120 and methods 130. Properties 120 are values used to represent certain characteristics of class 110, such as a unit of data. Methods 130 represent behavior characteristics of class 110.

Classes may be associated with subclasses that inherit characteristics from respective classes. As shown in FIG. 1, subclasses 140 and 150 have a hierarchical relationship with class 110, represented by the link 115. Thus, subclasses 140 and 150 include the characteristics of class 110, with additional characteristics uniquely defined for each subclass. A relationship between objects in a hierarchical model may also be defined between peers, such as subclasses 140 and 150. Such a relationship is represented by an association in the CIM. An association is a class that comprises two or more references. References are basically pointers to other objects and define the role each object plays in an association. An association allows the CIM schema to establish a relationship between objects without affecting the objects themselves. As shown in FIG. 1, an association 160 establishes a relationship between subclasses 140 and 150. The association 160 has two references. One reference 165 is directed to subclass 150, while another reference 167 is directed to subclass 140.

In the CIM model, only associations have knowledge of relationships between classes. With reference to FIG. 1, only association 160 has knowledge that subclass 150 is related to subclass 140 via references 165 and 167, respectively. Subclass 140, however, has no information indicating to either association 160 or subclass 150. Likewise, subclass 150 has no reference to either association 160 or subclass 140.

While FIG. 1 illustrates subclasses dependent upon a base class, other objects may be defined as well. For example, an instance may be defined that also inherits characteristics from an object it depends upon. An instance is a representation of a managed object that belongs to a particular class, or occurrence of an event. That is, an instance of a class includes real data that relates to a real world managed object. For example, suppose class 110 represents a class labeled CAR, and includes the inherent base characteristics for such a class. An instance of class 110 may represent, for example, a car driven by a particular driver. Another instance may represent a particular make of the car class 110. As described, objects such as instances are defined dynamically as the CIM schema grows. Each time an object is defined, any relationships between the newly defined object and existing objects are generally maintained in the form of an association.

While the use of associations introduces a method for relating objects, a problem may occur when the relationship between the objects is requested by an application. In the CIM, the link information for an association and its referenced objects is stored with the association instance. That is, referring to FIG. 1, references 165 and 167, which define the relationship between subclasses 140, 150 and association 160, are located with association 160. Therefore, in order to collect relationship information regarding subclasses 140 and 150, association 160 would have to be examined (traversed). As a result, in order to determine if there is a relationship between any two or more objects, each instance of all associations defined in a CIM schema would need to be examined to determine the existence of any related objects.

In a conventional CIM schema, there is no way to recognize a relationship between two or more instances that are "separated" by intermediate associations. As an example, as shown in FIG. 2, an instance of a particular class 210 is related another instance 220 by an association 215. Instance 220 has a plurality of relationships with instances 230, 240 and 250, represented by associations 222, 224 and 226, respectively. Instances 230, 240 and 250 each are separate instances of class 1, while associations 215, 222, 224 and 226 are separate instances of a class association A-1. In the conventional CIM schema depicted in FIG. 2, in order to find the relationship between instance 210 and any of instances 230, 240 and 250, all associations 215, 222, 224 and 226 must be examined to identify the desired relationship. In the event a request to determine all instances associated with instance 210 is made (such as instances 220, 230, 240 and 250), all associations related to instance 210 would have to be examined to determine which objects relate to instance 210. This technique is extremely inefficient, especially in a well established schema with a complex hierarchy.

SUMMARY OF THE INVENTION

It is therefore desirable to provide a method and system that enable the relationship between objects in a CIM implemented system to be realized without having to traverse each instance of an association.

Methods, systems and articles of manufacture consistent with the present invention enable a CIM Object Manager (CIMOM) to create and store reverse links from an object to an association. The CIM Object Manager may then subsequently use the reverse links to efficiently determine the objects associated to a given input object, such as an instance of a class.

In accordance with an aspect of the invention, clients initiate requests to create classes and instances. The requests may be sent through a network to a server node that incorporates a CIM Object Manager that performs CIM object management functions. The CIM Object Manager processes the requests, creates the classes and instances for each class, and stores them in a CIM Object Manager repository. The CIM Object Manager creates wrappers for each instance of each class stored in the repository. The wrappers are accessible only by the CIM Object Manager, and do not interfere with object definitions. The wrappers provide knowledge to a class instance outside the object definition itself, of what relationships it participates in. In one aspect of the invention, the wrappers for each class instance point to a second level table for each association class that references the class instance. The CIM Object Manager defines association instances for each class instance that has a relationship with another class instance. In addition to creating and storing association instances in the repository, the CIM Object Manager creates references within each wrapper of a class instance. In another aspect of the invention, the wrappers for each class instance point to a second level table that contains references directed to the association class instances that reference the class instance.

When the server node receives a client request for the relationship for a specific instance of a class, the CIM Object Manager accesses the reverse links stored in the wrapper of the instance associated with the request, or alternatively stored in the second level tables. The CIM Object Manager uses the reverse links to determine the relationship between the requested instance, and any other associated objects. The server node then sends the relationship information to the client.

Accordingly, methods, systems and articles of manufacture consistent with the present invention enable association traversal requests to be handled without having to traverse each instance of the associations defined in an object repository.

Additional features of the invention will be set forth in part in the description which follows, and in part will be obvious from the description, or may be learned by practice of the invention.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention. In the drawings:

FIG. 5B is a block diagram of wrapper tables associated with the CIM hierarchy illustrated in FIG. 5A, in accordance with methods and systems consistent with features of the present invention;

FIGS. 5D and 5E are block diagrams of wrapper tables associated with the CIM hierarchy illustrated in FIG. 5C, in accordance with methods and systems consistent with features of the present invention;

FIG. 6D is a block diagram of the exemplary CIM hierarchy shown in FIG. 6A when another instance is added to the hierarchy, in accordance with methods and systems consistent with features of the present invention

DETAILED DESCRIPTION

The following description of embodiments of this invention refers to the accompanying drawings. Where appropriate, the same reference numbers in different drawings refer to the same or similar elements.

In accordance with an aspect of the present invention, clients initiate CIM requests to create objects, generally, instances. The requests are received, via a network, at an object manager node incorporating a CIM Object Manager. The CIM Object Manager processes the requests and defines the objects stipulated in the client requests, and stores the definitions in a CIM Object Manager repository. Wrappers are then created for each defined object, and also are stored in the repository. The CIM Object Manager then defines associations related to the objects defined in the repository. For each association that is defined in the repository, the CIM Object Manager creates a reverse link that shows a reverse reference from each object to its respective associations. Thus, when a client initiates a relationship request associated with a particular object, the CIM Object Manager utilizes the reverse links to process the request.

The requests may be generated based on an operation defined by a Web Based Enterprise Management (WBEM) specification. WBEM is an initiative that provides standard based management tools for creating a compatible computing environment for technologies like CIM and eXtensible Markup Language (XML). The requests may include a standard association traversal request. An Object Manager, among other standard management operations, also includes a predefined association traversal operation. This operation enables the Object Manager to traverse all associations of a given object.

Figure 3:
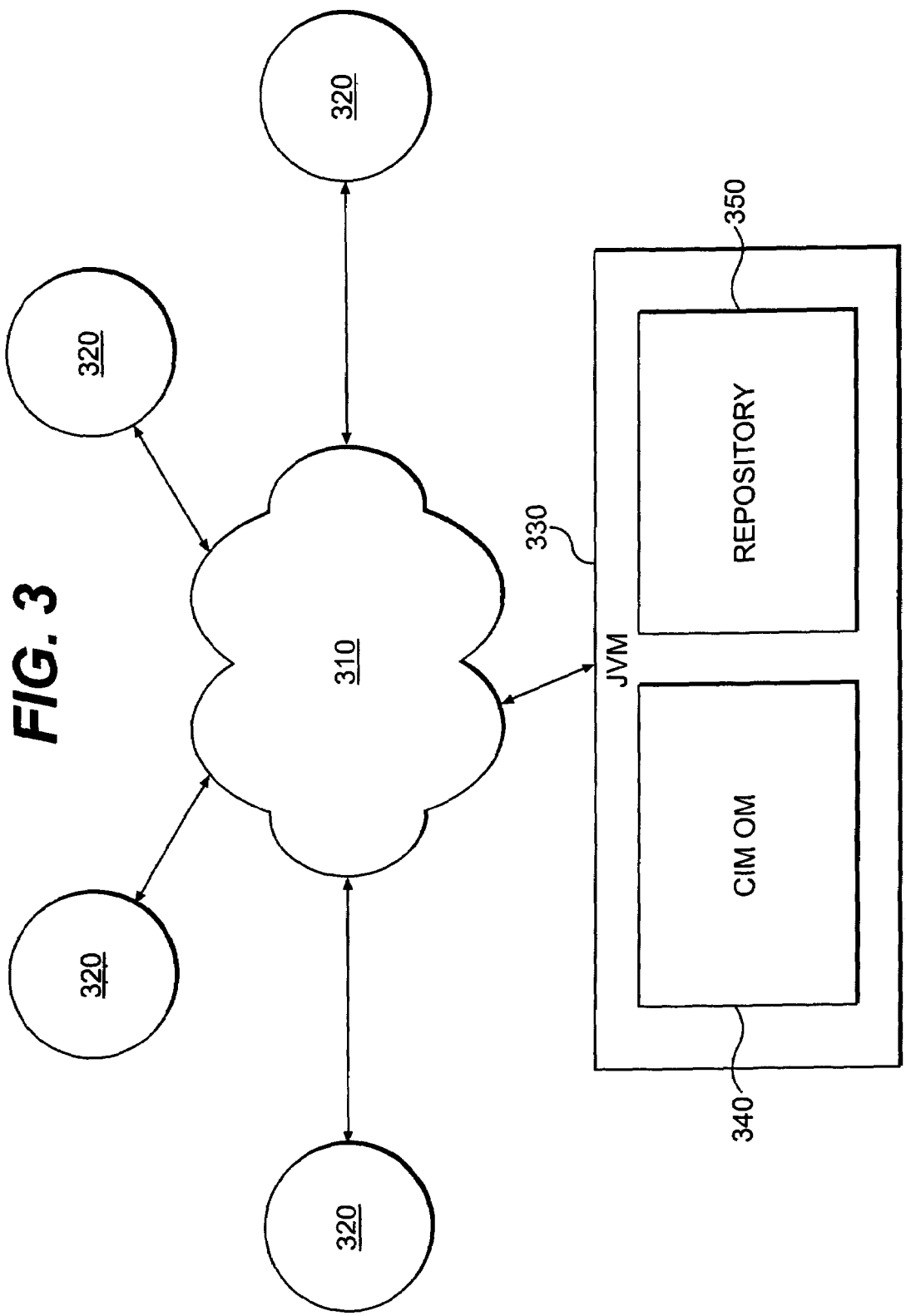
FIG. 3 is a block diagram of a CIM based network, in accordance with methods and systems consistent with features of the present invention.

FIG. 3 shows an exemplary system implementing the CIM association traversal techniques consistent with the present invention. As shown, the exemplary system comprises a Java™ Virtual Machine (JVM) 330, a network 310 and clients 320. JVM 330 further comprises a CIM Object Manager 340 and repository 350. JVM 330 may operate on a conventional computer system (not shown) such as an IBM PS/2 personal computer but is not limited to any particular system. JVM 330, may operate on any number of computer systems such as network computers, workstations, and even mainframe computers having architectures dissimilar to FIG. 3.

A client 320 is a computer system that may use the Java™ programming language and Java™ virtual machine architecture. A client 320 utilizes objects managed by JVM 330, by initiating requests, which may be facilitated through network 310. A client 320 may also initiate requests for the creation of new objects to be defined in repository 350.

JVM 330 is a microprocessor implemented in software that runs using the capabilities provided by an operating system and computer hardware associated with the computer system that JVM 330 is implemented with. JVM 330 acts as an interpreter between Java™ bytecodes and the particular computer system (not shown) employing the JVM 330. Bytecodes are compiled Java™ source code created using the Java™ programming language. The Java™ programming language is platform-independent, thus its utility is not bound to one particular platform (i.e., operating system and hardware). The advantages of a Java™ virtual machine architecture is that the virtual machine can be implemented in software in a variety of operating systems and hardware. Implementing a JVM on a particular platform enables the bytecodes to run without recompiling them. This is useful in a network that interconnects heterogeneous systems, such as the Internet.

JVM 330 accepts requests from clients 320 for objects, including classes and S instances, defined in repository 350. These requests are interpreted and managed by CIM Object Manager 340. CIM Object Manager 340 is a CIM managing component that facilitates the interaction between a client 320 and management applications. CIM Object Manager 340 handles CIM based requests sent from clients 320, and manages repository 350. CIM Object Manager 340 defines classes, instances, associations, wrappers and reverse links.

Repository 350 is a storage area managed by CIM Object Manager 340. Repository 350 stores the definitions of classes, instances, associations, wrappers and reverse links created by CIM Object Manager 340.

Network 310 connects JVM 330 and clients 320, and may include one or more communication networks, including the Internet or any other similar network known in the art. Communication protocols used between elements connected to the network may be, but are not limited to XML, HTTP and TCP/IP.

Although FIG. 3 shows a network interconnecting JVM 330 and clients 320, it is understood that clients 320 and JVM 330 may be implemented in common system environment that does not require a network for the exchange of information. Furthermore, clients may include processes operating within the common system environment. Additionally, it should be understood that features and principles of the present invention need not be implemented as depicted in FIG. 3. That is, the repository 350 and Object Manager 340 shown in FIG. 3, are exemplary and is not intended to be limiting. For example, the repository 350 and object manager 340 need not be implemented with a virtual machine or a CIM environment, but may operate with other types of object-oriented processes that operate in a manner consistent with features and principles of the present invention.

Although FIG. 3 shows a network interconnecting JVM 330 and clients 320, it is understood that clients 320 and JVM 330 may be implemented in common system environment that does not require a network for the exchange of information. Furthermore, clients may include processes operating within the common system environment. Additionally, it should be understood that features and principles of the present invention need not be implemented as depicted in FIG. 3. That is, the repository 350 and Object Manager 340 shown in FIG. 3, are exemplary and are not intended to be limiting. For example, the repository 350 and object manager 340 need not be implemented with a virtual machine or a CIM environment, but may operate with other types of object-oriented processes that operate in a manner consistent with features and principles of the present invention.

Figure 4:
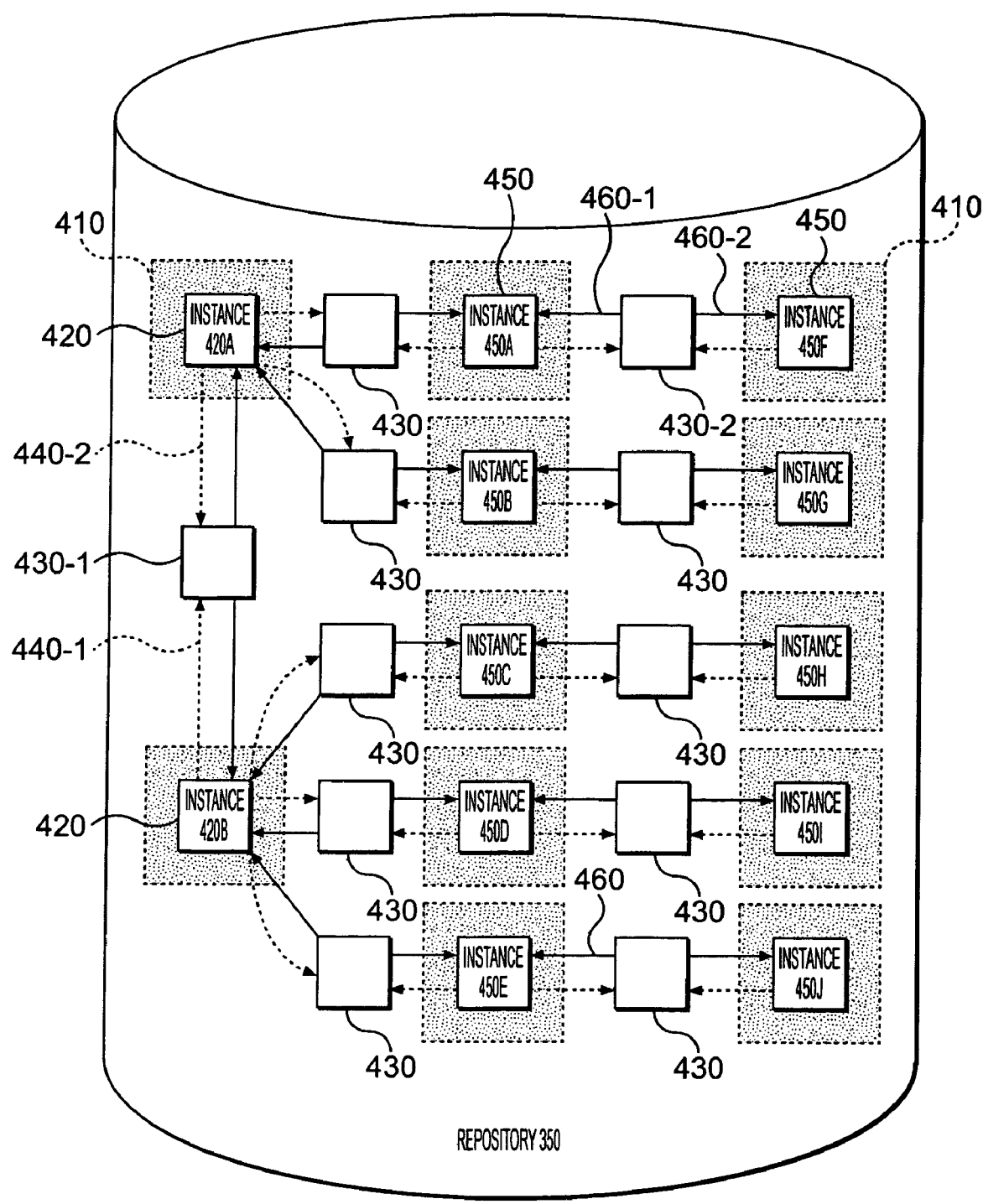
FIG. 4 is a block diagram of the CIM Object Manager repository illustrated in FIG. 3, in accordance with methods and systems consistent with features of the present invention.

FIG. 4 shows an exemplary block diagram of repository 350. As shown, repository 350 contains a plurality of defined objects 420, 450. In FIG. 4, the objects represented are instances 450A–450J of a first class defined in repository 350. Instances 420A and 420B, for exemplary purposes, represent instances of a second class defined in repository 350. Each instance may be associated with an association 430 that represents a relationship between objects. For example, instances 420A and instance 450A have an association 430-1 establishing a relationship between these two objects. Associations 430 are considered classes in the CIM, and provide links 460 (represented as solid line arrows) to an object, such as instance 420 or instance 450. Each association class in turn may have instances defined as well. Thus, the associations 430 shown in FIG. 4, may represent instances of a single association class. Links 460 point to instances and reflect a relationship between them. For example, instance 450A and instance 450F have a defined association 430-2 between them. Link 460-1 defines a reference from association 430-2 to instance 450A, and link 460-2 defines a reference from the association 430-2 to instance 450F. Repository 350 also includes wrappers 410 for each instance, 420 and 450. Each wrapper 410 is a locally maintained table that is specific to an instance it "wraps." As shown in FIG. 4, each wrapper (depicted as the shaded area surrounding an instance) "wraps" around an instance 420 or instance 450. These wrappers may also be referred to as instance wrappers. Wrappers 410 will be described in further detail below with respect to FIGS. 5A–5D and 6A–6E.

CIM Object Manager 340 establishes and manages the definitions of instances 420, 450, associations instances 430, links 460, wrappers 410 and reverse links 440. Each time an instance is created in repository 350, CIM Object Manager 340 generates associations 430 based on the hierarchical relationship associated with each defined object. In turn, whenever an association is defined, CIM Object Manager generates reverse links within each respective wrapper. FIGS. 5A–5D illustrate this process, in accordance with one aspect of the invention.

Figure 1:
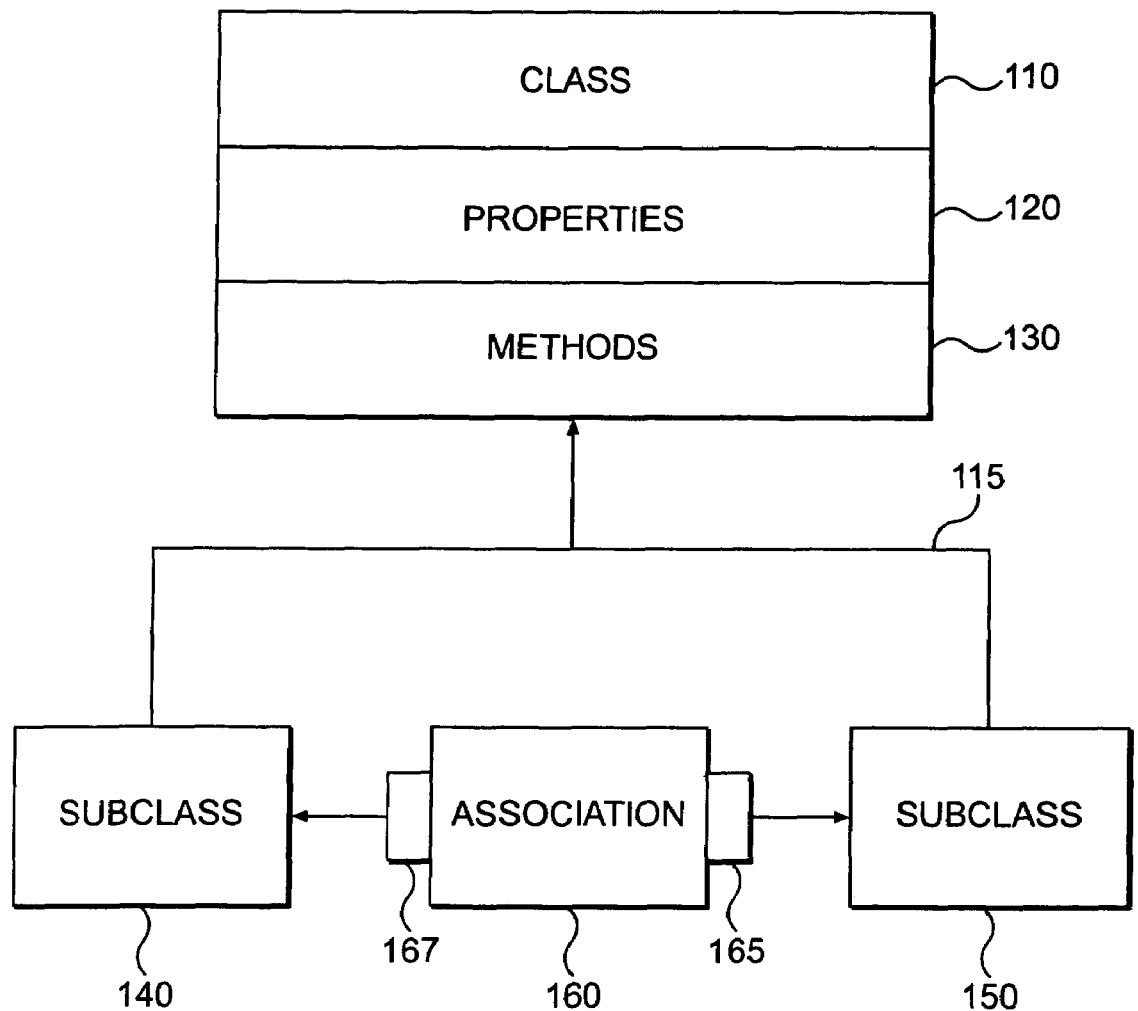
FIG. 1 is a block diagram of an exemplary conventional object oriented model.
Figure 2:
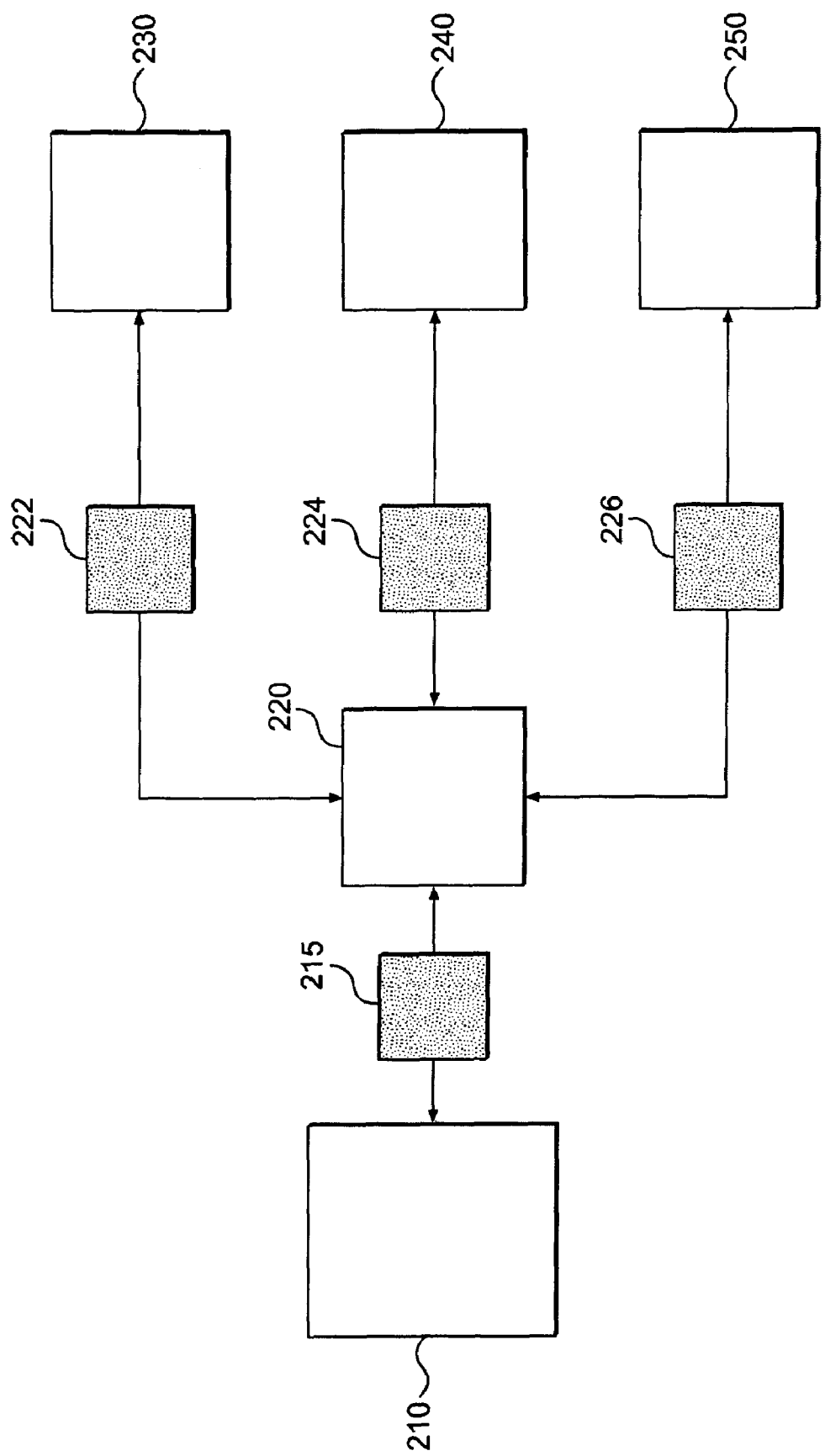
FIG. 2 is a block diagram of an exemplary conventional CIM hierarchy.
Figure 5A:
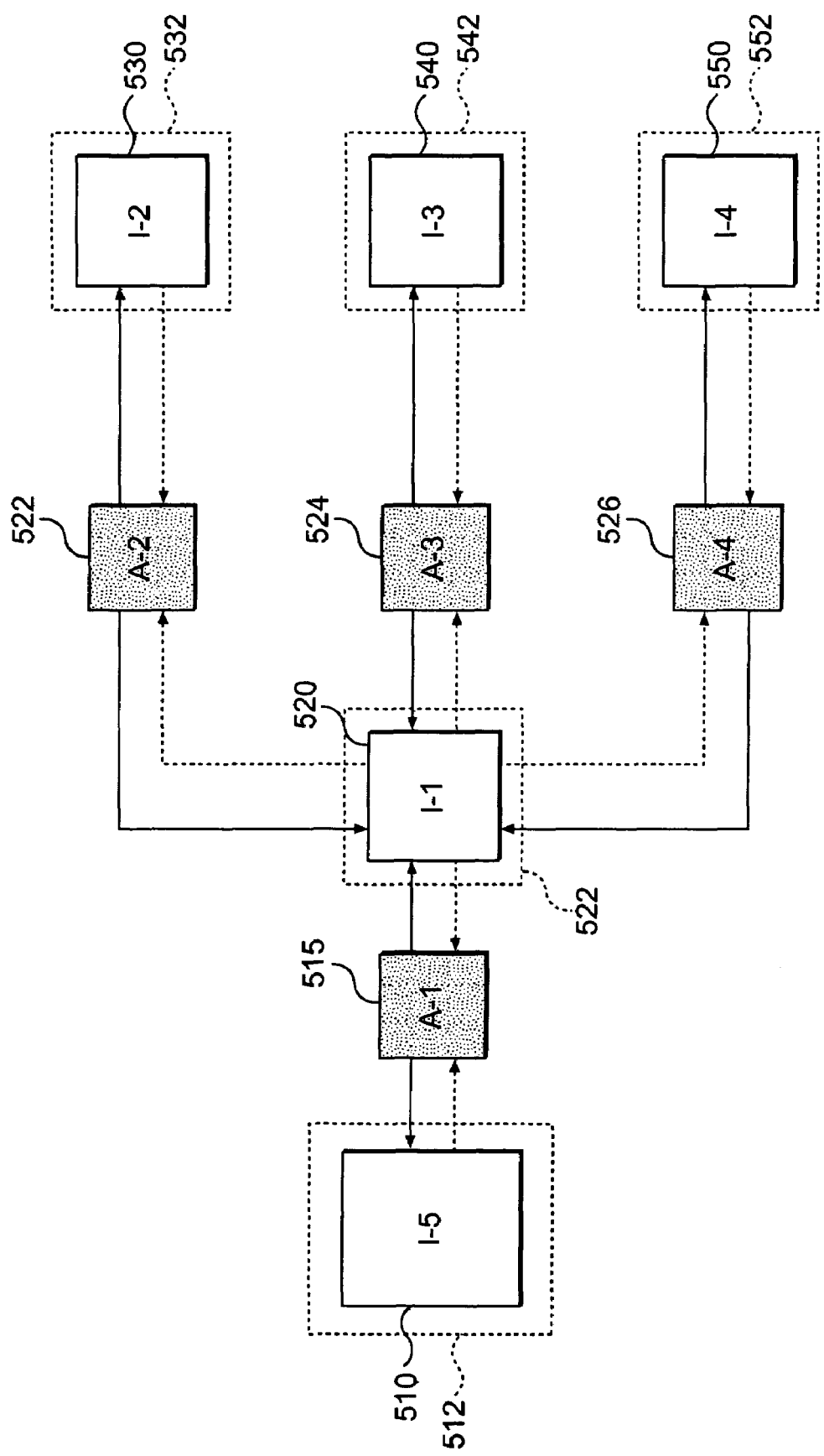
FIG. 5A is a block diagram of an exemplary CIM hierarchy, in accordance with methods and systems consistent with features of the present invention.

FIG. 5A shows a CIM model similar to that represented in FIG. 2. That is, the model includes instances of various classes, represented by instances 510 (I-5), 520 (I-1), 530 (I-2), 540 (I-3) and 550 (I-4), and associations 515 (A-1), 523 (A-2), 524 (A-3) and 526 (A-4). Also included in the model illustrated in FIG. 5A, are wrappers associated with each instance. Specifically, instance wrapper 512 is associated with instance 510 (I-5), instance wrapper 522 is associated with instance 520 (I-1), instance wrapper 532 is associated with instance 530 (I-2), instance wrapper 542 is associated with instance 540 (I-3) and instance wrapper 552 is associated with instance 550 (I-4). The wrappers shown in FIG. 5A are depicted in detail in FIG. 5B.

FIG. 5B shows repository 350 containing the wrappers, or wrapper tables, associated with each instance illustrated in FIG. 5A. As shown, instance 5 wrapper table is related to wrapper 512 in FIG. 5A, while the instance wrapper tables 1–4 correlate to the instance wrappers 522, 532, 542 and 552 in FIG. 5A, respectively. Each wrapper table includes a reference to an association instance that has been defined for its respective instance, depending upon the representation of the wrapper. That is, instance 5 wrapper table is defined for instance 510 (I-5) in FIG. 5A, and any associations defined for that instance will be represented in its wrapper table. Instance 5 wrapper table includes association 515, labeled A-1, corresponding to the relationship depicted in FIG. 5A. Also included in each wrapper table are reverse links established for each relationship with the association listed in a respective wrapper. Again referring to the instance 5 wrapper table, and FIG. 5A, it can be seen that association A-1 defines a relationship between instance I-5 of class 1 and instance I-1 of class 2. Accordingly, instance 5 wrapper table also defines the relationship of association A-1 with instance I-1. As there are no other associations defined for instance I-5, the remainder of its wrapper table is empty.

The remaining wrapper tables are similarly configured with information. Referring to instance 1 wrapper table and FIG. 5A, it can be seen that instance I-1 has four association instances related to it, A-1 through A-4. These are indicated in its wrapper table. Association instance A-1 has references to instance I-5, thus instance 1 wrapper table includes a reverse link that establishes this relationship. The same is true for the relationships between association instances A-2 through A-4. Instance 1 wrapper table include the reverse links that show the relationship between each association instance and instances I-2 through I-4.

Instance wrappers are dynamically managed by CIM Object Manager 340, in order to maintain an updated version of the hierarchical relationship of a CIM scheme. At any time, a client 320 may request the creation of additional objects. CIM Object Manager 340 updates repository 350, and the wrappers for each affected instance, whenever a new association is defined.

Figure 5C:
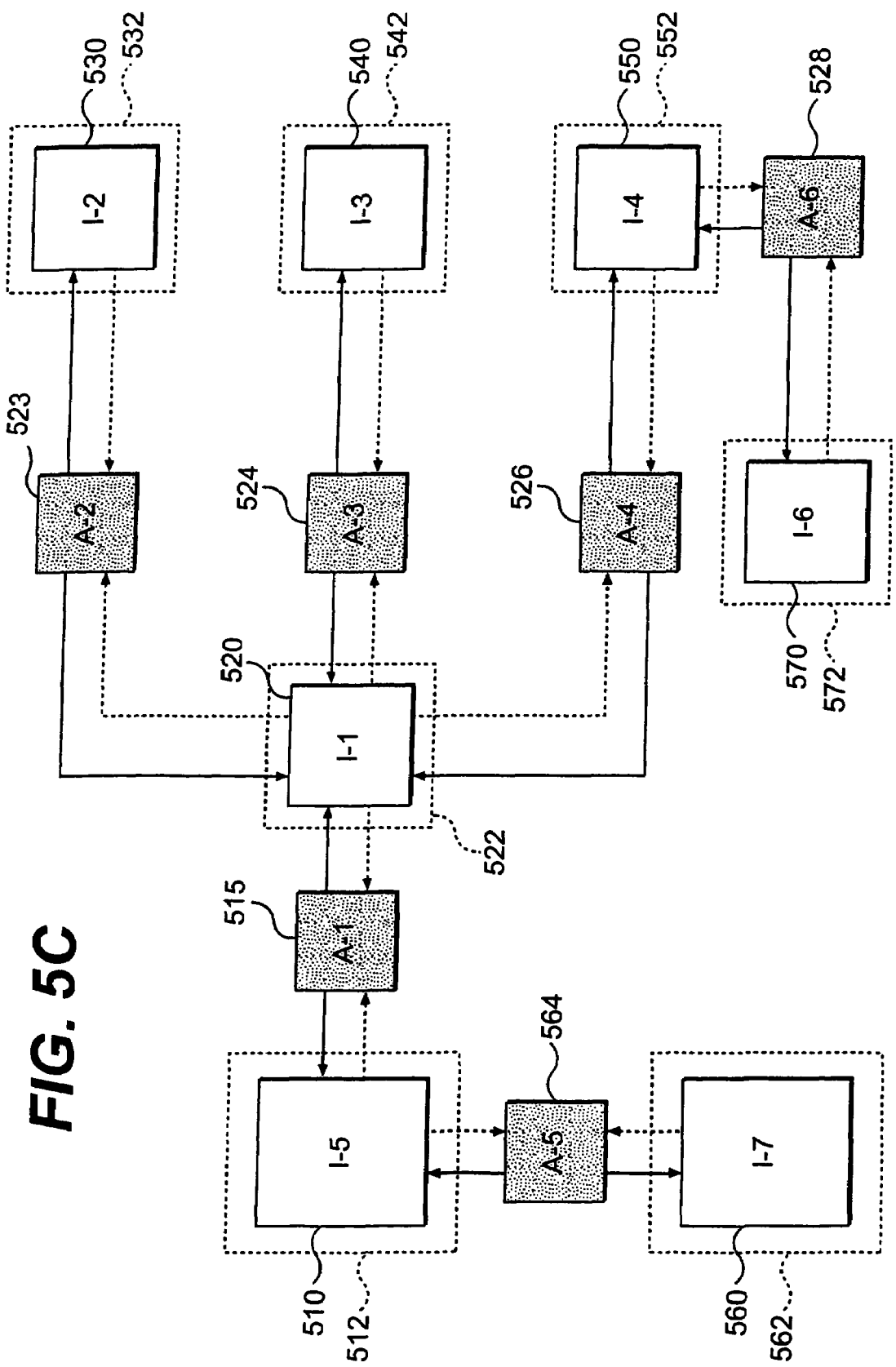
FIG. 5C is a block diagram of an exemplary CIM hierarchy, in accordance with methods and systems consistent with features of the present invention.
Figure 7:
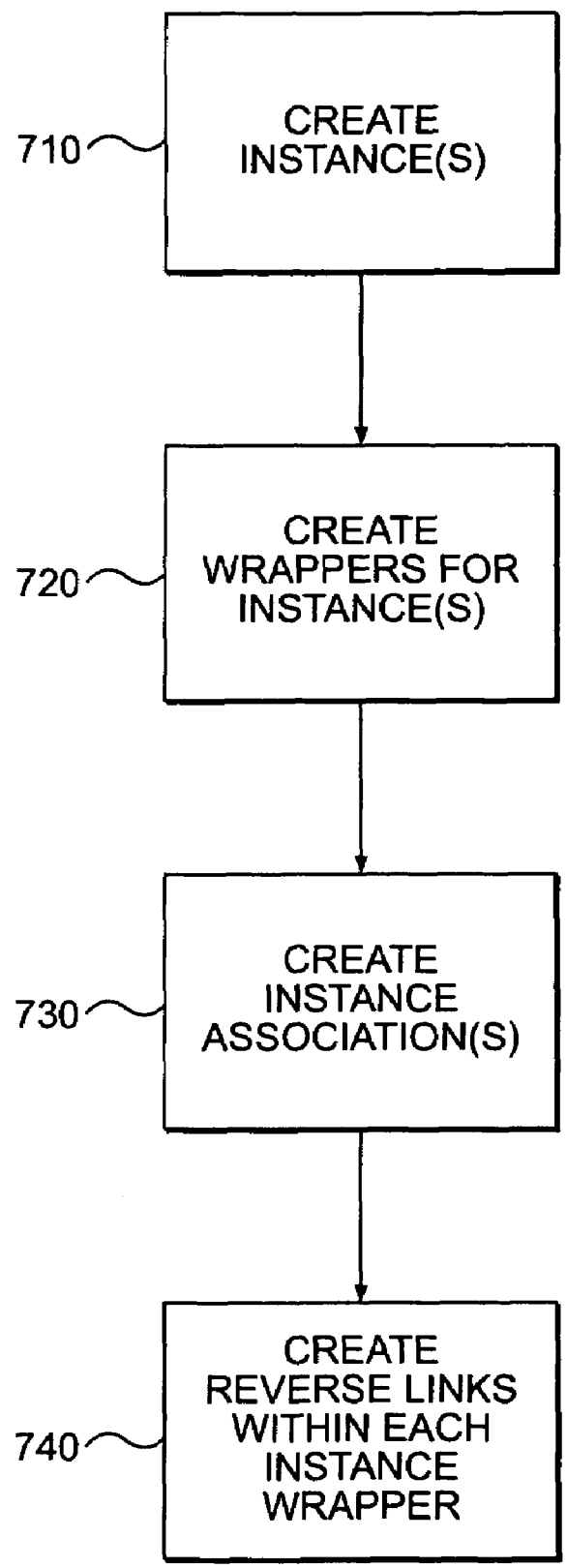
FIG. 7 is an exemplary flow chart of a process performed by the CIM Object Manager associated with the creation of new instances, in accordance with methods and systems consistent with features of the present invention.

FIG. 7 shows an exemplary process performed by CIM Object Manager 340 when a request to create a new instance is received from a client 320. A client 320 sends a request to create a new object, such as an instance of a particular class, over network 310 (Step 710). The request may be performed using XML/HTTP protocols. For example, one client 320 may initiate a request to create a new instance I-7 of class 1, while another client 320 may initiate a request to create a new instance I-6 of class 1. Referring to FIG. 5C, CIM Object Manager 350 receives the requests and defines the new instance I-7, and stores the definition in repository 350. CIM Object Manager 340 then creates a wrapper for the newly defined instance (Step 720). A wrapper is created by creating a wrapper table for the new instance. In this case, a new wrapper table for instance 7, would be created in repository 350. The new wrapper table includes default fields to be filled relating to associations and reverse links correlated to these associations. FIG. 5D shows repository 350 including newly defined wrappers, instance 6 wrapper table and instance 7 wrapper table.

CIM Object Manager 340 defines an association instance 564 (A-5) between instance I-5 and instance I-7 (step 730), using the characteristics of new instance I-7. FIG. 5C illustrates the new association 564 (A-5), including its links pointing to instances I-5 and I-7. Once CIM Object Manager 340 recognizes a newly defined association instance, it determines all objects the new association instance defines a relationship between. In this case, association instance A-5 establishes a relationship between instances I-5 and I-7. Accordingly, CIM Object Manager 340 defines reverse links within each instance's wrapper (Step 740). The reverse links are represented by the dotted lines pointing from wrappers 512 and 562 to association 564 (A-5) in FIG. 5C.

FIG. 5E illustrates how the wrappers in repository 350 are modified based on the created reverse links. The addition of newly defined instance I-7, and association A-5 triggers CIM Object Manager 340 to add the reverse links to the instance 5 wrapper table. As depicted, the instance 5 wrapper table includes a reverse link showing the relationship between association A-5 and instance I-7. Furthermore, newly defined wrapper table for instance I-7 is modified to include the relationship A-5 between instance I-7 and instance I-5.

The process for creating and maintaining the new instance wrapper for instance I-6 in repository 350 is the same as that described for instance I-7. That is, once CIM Object Manager 340 defines an association instance A-6 between instances I-6 and I-4, a new wrapper table for the new instance I-6 is created in repository 350 and reverse links (depicted in FIG. 5C as dotted lines pointing from wrappers 552 and 572 to association A-6) are defined within each instance's wrapper table. Referring to FIG. 5E, the newly defined instance 6 wrapper table includes a reverse link showing the relationship between association instance A-6 and instance I-4. Furthermore, instance 4 wrapper table includes a reverse link showing the relationship between association instance A-6 and instance I-6.

Accordingly, CIM Object Manager 340 dynamically adjusts repository 350 with new reverse links each time an instance of an association is created. This keeps repository 350 updated with the most recent relationships for instances defined by CIM Object Manager 340. In keeping an updated status of these relationships enable association traversals to be performed more efficiently by the CIM Object Manager 340.

Although the wrapper table structure described above, provides efficient association traversals, the structure is not rigid. That is, other wrapper structures may be employed to provide traversal operations. In one aspect of the invention, the wrapper tables defined in repository 350, include pointers to secondary level association class wrapper tables. These secondary tables include each instance of a respective class association, and the reverse links to corresponding objects. FIGS. 6A–6E illustrate this aspect of the invention.

Figure 6A:
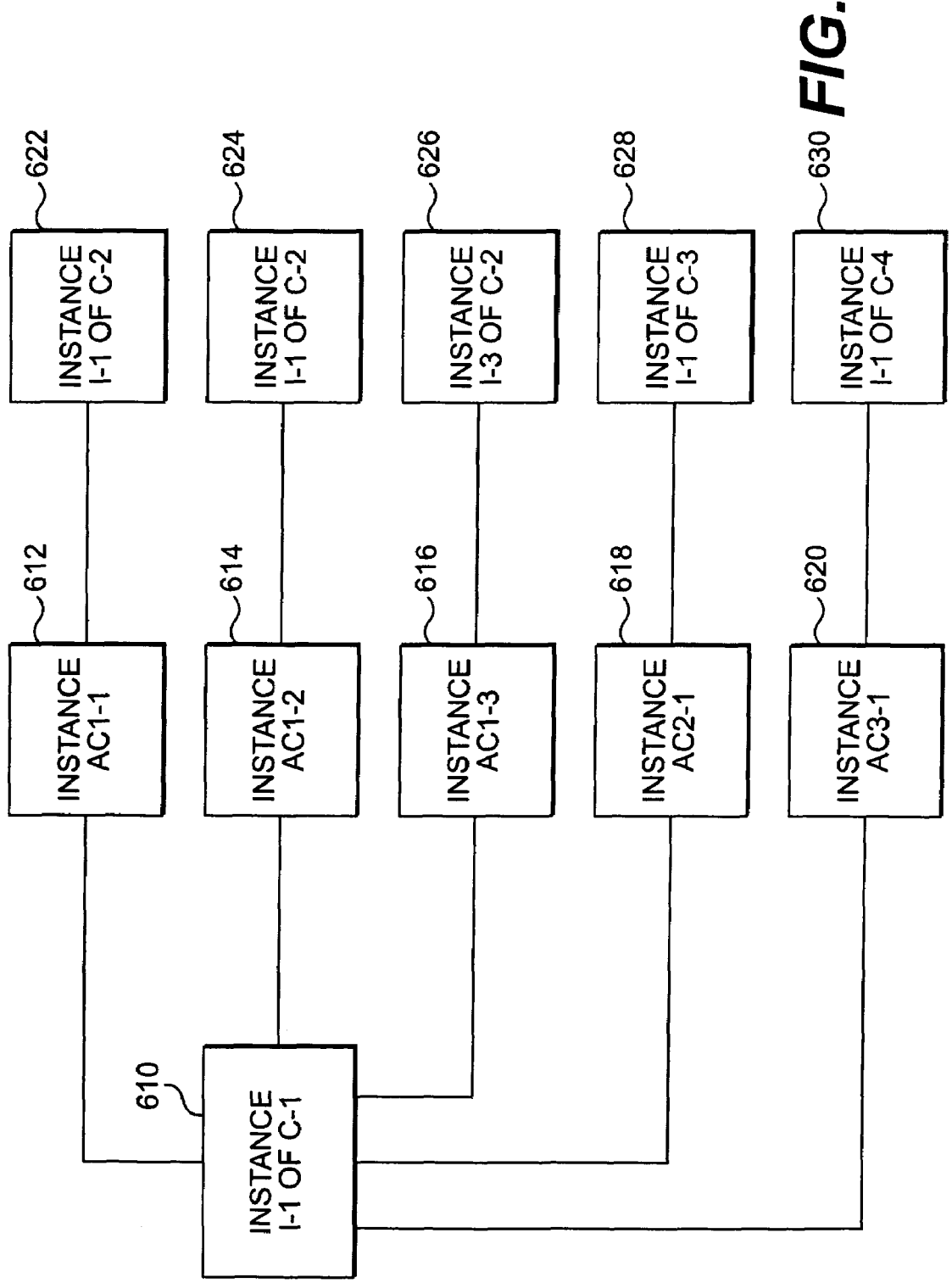
FIG. 6A is a block diagram of an exemplary CIM hierarchy, in accordance with methods and systems consistent with features of the present invention.

As shown, FIG. 6A shows a CIM hierarchy similar to that represented in FIG. 5A. However the model illustrated in FIG. 6A includes instances of several classes C-1 to C-4, and instances of several different association classes A-1 to A-3. As shown, an instance of a first instance of class C-1 is represented by instance I-1 of class C-1 (610), while instances I-1 of C-2, I-2 of C-2 and I-3 of C-2 (622, 624 and 626, respectively), reflect instances of a second class, C-2. Additionally, individual instances of a third and fourth class are shown by I-1 of C-3 (628), and I-1 of C-4 (630). Instances 622–630 are each related to instance 610 through association instances of varying association classes 612, 614, 616, 618 and 620, respectively. Each association instance is an instance of an association class. As shown in FIG. 6A, instances AC1-1, AC1-2 and AC1-3 are in association class AC1, instance AC2-1 is in association class AC2, and instance AC3-1 is in association class AC3. Although not shown in FIG. 6A, a wrapper is associated with each respective class instance. These wrappers are described below with reference to FIG. 6B.

Figure 6B:
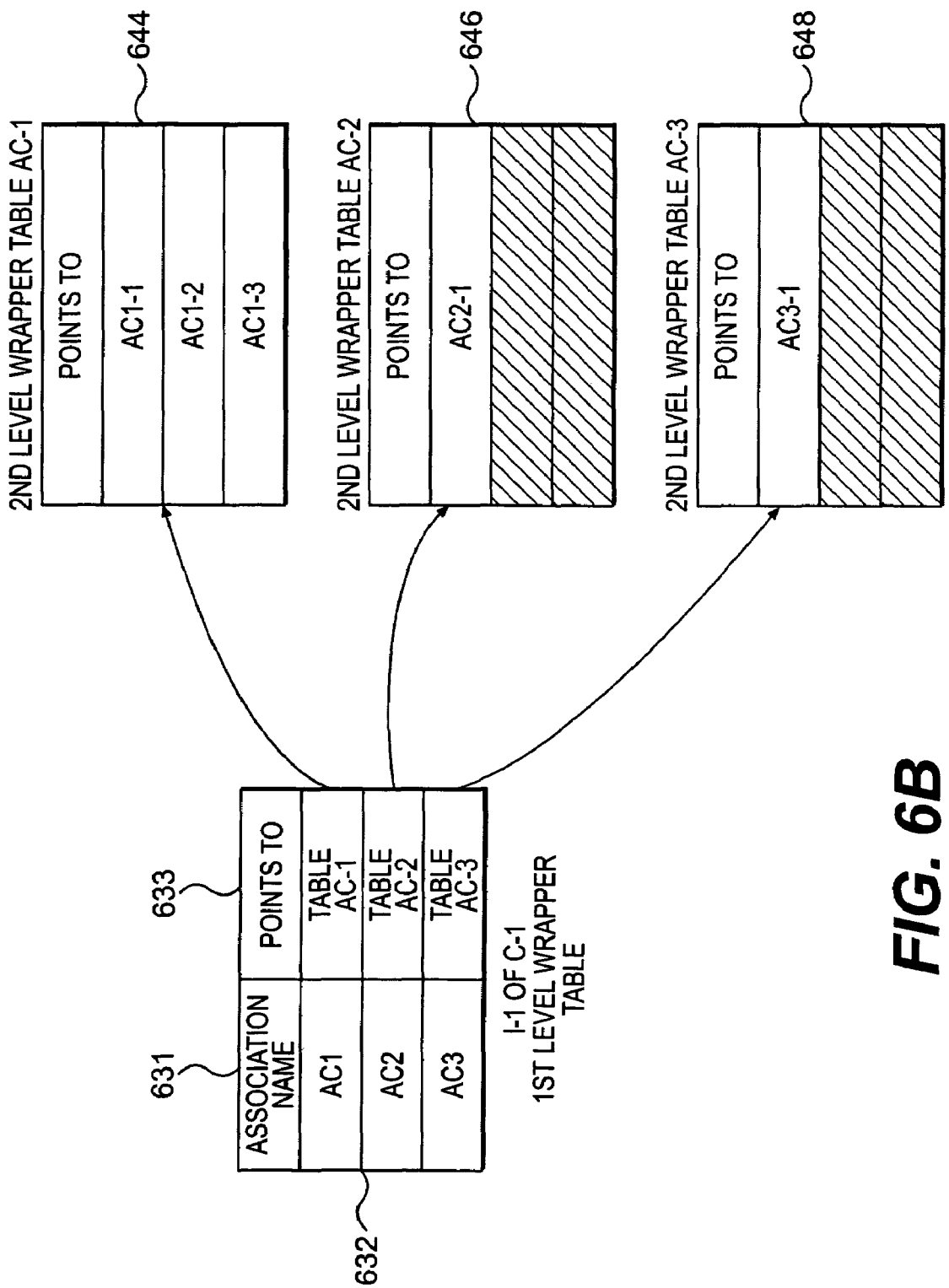
FIG. 6B is a block diagram of wrapper tables associated with the CIM hierarchy illustrated in FIG. 6A, in accordance with methods and systems consistent with features of the present invention.

FIG. 6B represents a wrapper table defined in repository 350 associated with class instance I-1 of C-1 (610) illustrated in FIG. 6A. As shown in FIG. 6B, wrapper table 632 includes a column 631 identifying association classes that have instances that are "associated" with instance I-1 of C-1 (610). Also, the wrapper table 632 includes a column 633 identifying pointers to a second wrapper table corresponding to the association classes identified in column 631. For example, column 631 of wrapper table 632 contains identifiers for association classes AC1, AC2 and AC3, and column 633 includes pointers to second level tables for these association classes 644, 646 and 648, respectively.

Wrapper table 632 correlates to the relationship illustrated in FIG. 6A, for instance I-1 of C-1. Referring to FIG. 6A, it can be seen that instance I-1 of C-1 (610) includes references to three different association classes AC1, AC2 and AC3. Although there are several instances of association class AC1 referencing instance I-1 of C-1 (610), the wrapper table 632 for instance (610) only includes pointers to the association classes, not to the instances of these association classes.

Referring back to FIG. 6B, the second level tables 644, 646 and 648 that are referenced by column 633 include the appropriate association instances. As shown in FIG. 6B, second level wrapper table AC-1 (644) includes pointers to each instance of association class AC1. Moreover, second level wrapper table 646 includes pointer to each instance of association class AC2, and second level wrapper table 648 includes pointer to each instance of association class AC3.

Figure 6C:
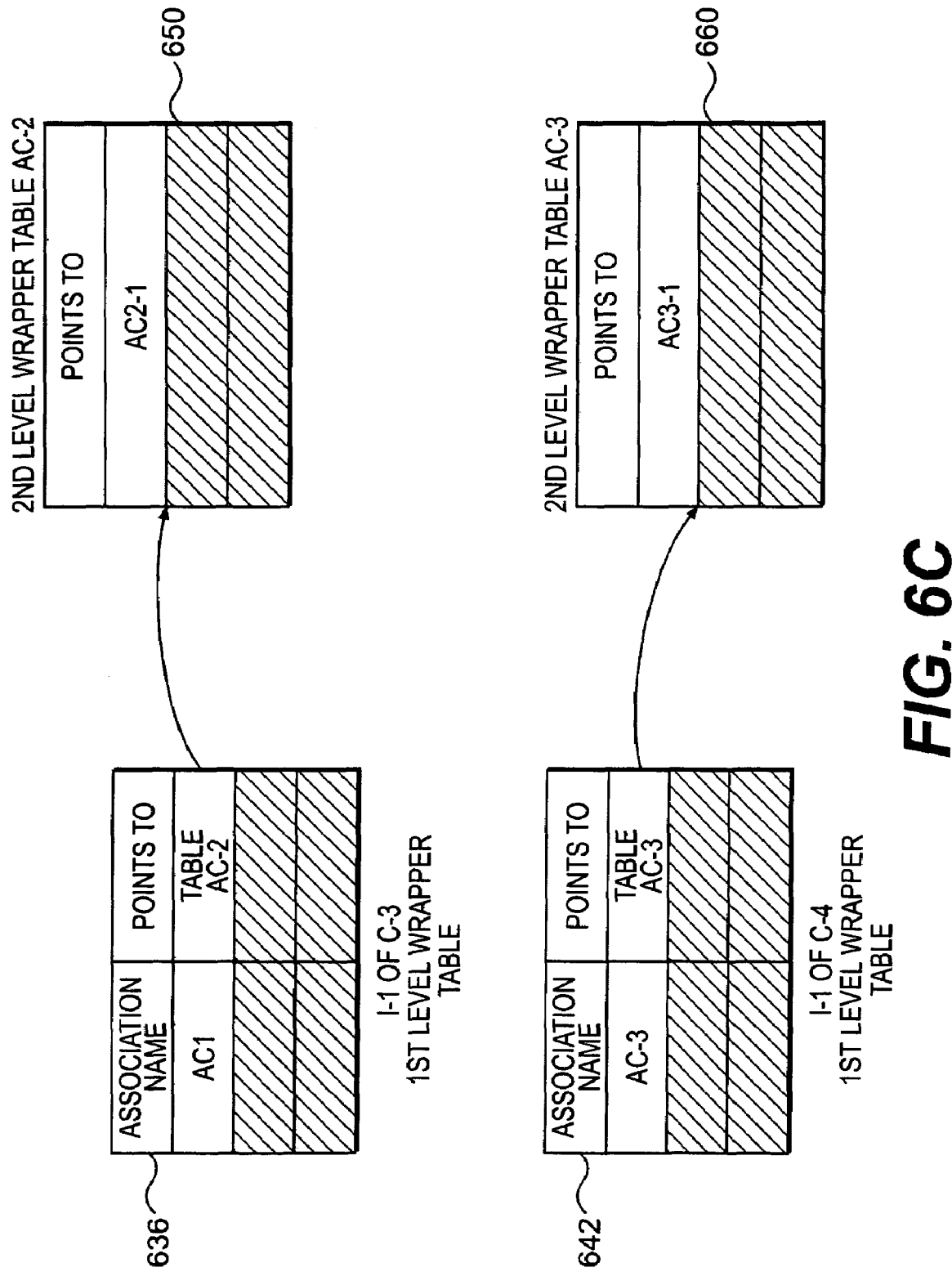
FIG. 6C is another block diagram of wrapper tables associated with the CIM hierarchy illustrated in FIG. 6A, in accordance with methods and systems consistent with features of the present invention.

To further explain the features and principles of the present invention, FIG. 6C shows the wrapper tables associated with instance I-1 of C-3 and instance I-1 of C-4. As with the wrapper tables depicted in FIG. 6B, the wrapper tables illustrated in FIG. 6C correspond to the hierarchy illustrated in FIG. 6A. Particularly, FIG. 6C shows a wrapper table 636 including an identifier for association class AC2 and a pointer to a second level wrapper table 650 corresponding to association class AC2. Second level wrapper table 650 includes a pointer to the instance of association class AC2-1. Wrapper table 642 includes an identifier for association class AC3 and a pointer to second level wrapper table 660 corresponding to association class AC3. And, second level table 660 includes a pointer to association class instance AC3-1.

To illustrate the dynamic management of the wrapper table of this aspect of the invention, FIG. 6D shows new instance objects 670 and 680 added to the CIM of FIG. 6A. These new objects may be added using the same client request process described for the aspect of the present invention illustrated in FIGS. 5A–5E and 7. That is, a client 320 may initiate a request to create a new instance of class 5 (I-1 of C-5) in repository 350. Once CIM object manager 340 defines the new instance, an association instance is formed, based on the characteristics of instance 1–4 of C-5. In this case, a new association class instance AC4-1 of association class AC4 is defined, that relates instances 680 and 622.

Figure 6E:
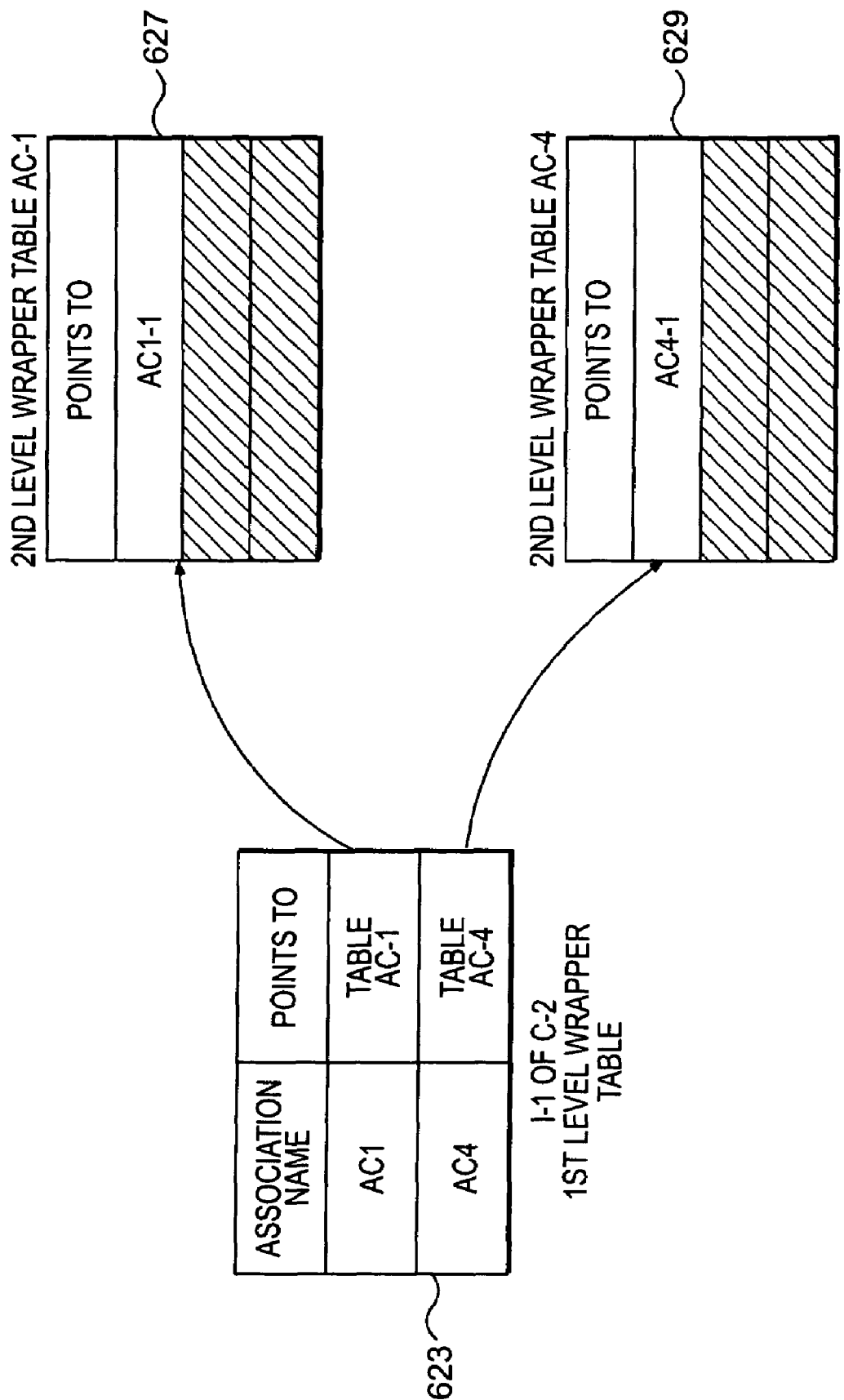
FIG. 6E is a block diagram of wrapper tables associated with the CIM hierarchy illustrated in FIG. 6D, in accordance with methods and systems consistent with features of the present invention.

After these objects are defined, a first level wrapper table for the affected class instances are modified to reflect the change to the CIM shown in FIG. 6D. As shown in FIG. 6E, the first level wrapper table 623 for class instance 622 is modified to reflect the new association class added to the CIM of FIG. 6D. Particularly, first level wrapper table 623 includes identifiers 625 for association classes AC1 and AC4 corresponding to the association classes that include instances that are related to class instance 622. Also, the first level wrapper table 623 includes pointers to second level wrapper tables 627 and 629, that correspond to the association classes AC1 and AC4, respectively. Second level table 627 includes a pointer to association class instance AC1-1, and second level table 629 includes a pointer to association class instance AC4-1.

As can be seen, methods and systems consistent with features of the present invention allow the first and second level wrapper tables to be used in order to maintain an updated "map" of all relationships between objects defined in repository 350. This allows specific object relationships to be efficiently provided when they are requested, by using known traversal methods and the defined wrapper tables.

Figure 8:
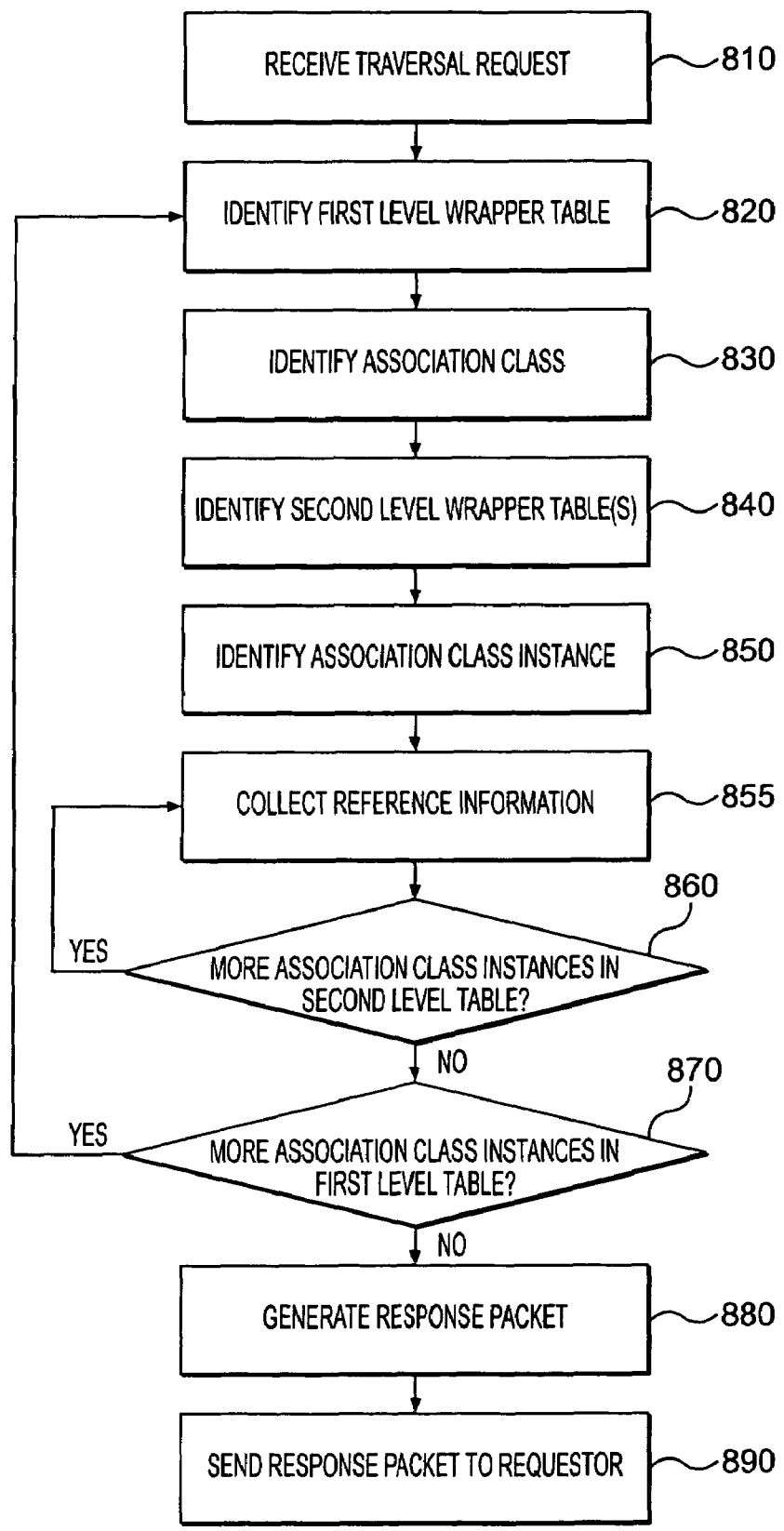
FIG. 8 is a flow chart showing association traversal operations, in accordance with methods and system consistent with features of the present invention.

FIG. 8 illustrates an exemplary process performed when using second level wrapper tables to perform a traversal request, consistent with features and principles of the present invention. The process begins when a traversal request is received by CIM Object Manager 340 to obtain association relations for a class instance (Step 810). Next, a defined first level wrapper table associated with the class instance designated in the request is located and accessed (Step 820). Once located, the appropriate association classes reflected in the first level wrapper table are identified (Step 830). For each association class reflected in the first level wrapper table, a pointer corresponding to the association class is used to identify and locate the appropriate second level wrapper table (Step 840). Afterwards, the identified second level wrapper table is accessed and each instance of the association class identified in the second level table is located using defined pointer information (Step 850).

The CIM Object Manager 340 accesses each association class instance identified in the second level wrapper table and references to class instances defined by these association class instances are collected (Step 855). This process repeats until there are no more association class instances identified in the second level wrapper table (Step 860). Once every instance in the second level wrapper table has been located and accessed (Step 860; NO), the first level wrapper table may be checked to determine whether there any more association classes identified in the first level wrapper table that have not been processed (Step 870). If there are more association classes, the process may be repeated by returning to Step 820. If no there are no more association classes to be processed, CIM Object Manager 340 packages the relationship information into a response for Java™ VM 330 (Step 880). Java™ VM 330 subsequently receives the packaged information and sends it to the client 320 that initiated the request (Step 890).

Although FIG. 8 shows the process steps associated with the first and second level tables being performed in a particular sequence, it is understood that this sequence is limiting to the present invention. That is, variations of the sequence of process steps described in FIG. 8 may be implemented without departing from the features and principles of the present invention. Moreover, the process described in FIG. 8 may be modified to accommodate a request to identify a particular object associated with the instance identified in the traversal request. That is, the process described in FIG. 8 may be modified to accommodate a single association class traversal identified in a first level wrapper table.

As described, methods and systems consistent with features of the present invention enables an efficient traversal technique to be implemented by CIM Object Manager 340 through the use of the wrappers defined in the repository. The process performed by CIM Object Manager 340 reduces the processing time and requirements for performing association traversals, by accessing the wrapper table associated with a target object. Without the wrappers, CIM Object Manager 340 would have to traverse each association to determine the objects that have relationships with the target object.

The wrappers defined in repository 350 are only accessible by CIM Object Manager 340. The information within the wrappers is not directly accessible by clients 320 or any other remote system. CIM Object Manager 340 manages the definitions in repository 350, and handles CIM based requests without sharing the data stored within the wrappers. CIM Object Manager 340 may use the wrapper information to provide a response to a request, but access to the wrappers is not given to any other component. Additionally, the wrappers themselves within repository 350 are non-volatile. That is, in the event a failure occurs that affects JVM 330, the wrapper tables defined within repository 350 are not lost. In one aspect of the invention, the system implementing Java™ VM 330 may include transaction logs that record any changes to the wrappers defined in repository 350. Thus, in the event of a failure that affects Java™ VM 330, changes to the wrappers may be reinstated by using the transaction log.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. Additional modifications and variations of the invention may be, for example, the described implementation includes software but the present invention may be implemented as a combination of hardware and software or in hardware alone. The invention may be implemented with both object-oriented and non-object-oriented programming systems.

Furthermore, one skilled in the art would recognize the ability to implement the present invention using various configurations. For example, where separate tables are described, such as shown in FIGS. 6B and 6C, it is understood that a single table may be used to store the wrapper table information. Alternately, a single table may be used for first level wrapper table information and a second single table may used for second level wrapper table information. Also, implementation of well known processing techniques and configurations may be utilized to facilitate efficient data retrieval. For example, the use of caching techniques may be used to store frequently requested object information thus further decreasing the time it takes to perform a traversal request. Such implementations are within the scope of one skilled in the art and may be facilitated using known cache configurations.

Moreover, it should be understood that the term "reverse link" is only a construct to aid in explaining features and principles of the present invention. Reverse links represent the relationships between objects and are not to be confused with actual physical "connections" between these objects.

Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A computer-implemented method for determining a relationship between objects related to a common information model, the objects including at least a first and second instance and an association that represents an instance of an association class, the method comprising:
   creating, for the first instance, a reverse link that defines a relationship between the first instance and the association, wherein the instance is associated with a first wrapper defining the reverse link, wherein creating the reverse link includes:
      defining a pointer in a first table of the first wrapper that references a second table; and
      defining a pointer in the second table that references the instance of the association class; and
   determining a relationship between the first and second instances based on the reverse link.

2. The method of claim 1, wherein each association reflects a relationship between a respective association and a corresponding associated object.

3. The method of claim 1, wherein determining a relationship includes:
   collecting a reference reflecting a relationship between the association and the second instance based on the pointer in the second table.

4. A method for maintaining reverse links in a object-oriented environment including class instances and associations, the method comprising:
   for each class instance associated with N instances of an association class that each reference the class instance, wherein N represents an integer value greater than or equal to one:
      (i) creating a first level wrapper table including a pointer to a second level wrapper table associated with the association class; and
      (ii) creating N pointers in the second level wrapper table that each reference an individual instance of the association class.

5. The method of claim 4, further comprising:
   for each new class instance and corresponding new association class instance that reference the new class instance that is created:
      (iii) creating a new first level wrapper table including a pointer to a new second level wrapper table associated with the association class; and
      (iv) creating a pointer in the new second level wrapper table that references the new instance of the association class.

6. The method of claim 4, further comprising:
   for each new class instance and corresponding new association class instance that is created:
      (iii) determining all instances of the association class that reference the new class instance;
      (iv) creating a new first level wrapper table including a pointer to a new second level wrapper table associated with the association class; and (v) creating a pointer in the new second level wrapper table for each instance of the association class determined in step (iii).

7. A method for maintaining reverse links in an object-oriented environment including instances, association classes and association class instances, the method comprising:

for each class instance associated with N association classes that each include at least one association class instance that references the class instance, wherein N represents an integer value greater than or equal to one:
creating a first level wrapper table including N pointers to N second level wrapper tables associated with the association classes.

8. A method for maintaining reverse links in a object-oriented environment including class instances and associations, the method comprising:

for each class instance associated with N instances of a first association class that each reference the class instance, and X instances of a second association class that each reference the class instance, wherein N and X represent integer values greater than or equal to one:
(i) creating a first level wrapper table including: a first pointer to a second level wrapper table associated with the first association class, and a second pointer to a second level wrapper table associated with the second association class;
(ii) creating N pointers, in the second level wrapper table associated with the first association class, that each reference an individual instance of the first association class; and
(iii) creating X pointers, in the second level wrapper table associated with the second association class, that each reference an individual instance of the second association class.

9. A method for performing association traversals in an object-oriented environment including a plurality of class instances and association instances, comprising:

receiving an association traversal request for a class instance; and
performing an association traversal process based on pointer information reflecting a relationship between the class instance and all association instances that reference the class instance, wherein the association traversal process includes:
accessing a first table including a pointer to a second table; and
accessing the second table, using the pointer, to obtain pointers to each association instance that references the class instance.

10. The method of claim 9, wherein the association traversal process further includes:
for each association instance pointed to by the second table:
collecting a reference to another class instance that is referenced by the association instance.

11. A method for performing association traversals in an object-oriented environment including a plurality of class instances and association instances, comprising:

receiving an association traversal request for a class instance;
obtaining pointers to each association instance that references the class instance from a wrapper table corresponding to the class instance; and
collecting, from the wrapper table, references to other class instances that are referenced by the association instance.

12. A method for performing association traversals in an object-oriented environment including a plurality of class instances and association instances, comprising:

receiving an association traversal request for a class instance; and
obtaining pointers to each association instance that references the class instance from a wrapper table corresponding to the class instance.

13. In a system comprising a client and a server, a method for performing association traversals performed by the client, comprising:

generating a request for relationship information associated with a selected class instance; and
receiving a response including information reflecting a relationship between the selected class instance and other class instances that are referenced by the same association class instances, wherein the response is generated using pointers defined in a table associated with the selected class instance that reference the common association class instances.

14. In a system comprising a client and a server, a method for performing association traversals performed by the server, comprising;

receiving a request for relationship information associated with a selected class instance; and
generating a response including information reflecting a relationship between the selected class instance and other class instances that are referenced by the same association class instances, based on pointers defined in a table associated with the selected class instance that reference the common association class instances.

15. A system for performing association traversals, comprising:

a client for generating a request for information reflecting the relationship between selected objects defined in a repository; and
a server including:
the repository for storing objects, wherein a set of the objects are associated with object wrappers, and wherein the object wrapper associated with one object includes pointers to all association instances that reference the one object; and
an object manager for processing the request by using an object wrapper associated with one object of the selected objects.

16. The system of claim 15, wherein the object manager uses the pointers to collect references to the selected objects.

17. A system for traversing associations in a common information model implemented environment, the model comprising at least a first and second instance and an association that represents an instance of an association class, comprising:

means for creating, for the first instance, a reverse link that defines a relationship between the first instance and the association, wherein the instance is associated with a first wrapper defining the reverse link, wherein the means for creating the reverse link includes:
means for defining a pointer in a first table of the first wrapper that references a second table; and
means for defining a pointer in the second table that references the instance of the association class; and
means for determining a relationship between the first and second instances based on the reverse link.

18. The system of claim 17, wherein each association reflects a relationship between a respective association and a corresponding associated object.

19. The system of claim 17, wherein the means for determining a relationship includes:
   means for collecting a reference reflecting a relationship between the association and the second instance based on the pointer in the second table.

20. A system for maintaining reverse links in a object-oriented environment including class instances and associations, comprising:
   means for creating, for each class instance associated with N instances of an association class that each reference the class instance, wherein N represents an integer value greater than or equal to one, a first level wrapper table including a pointer to a second level wrapper table associated with the association class; and
   means for creating N pointers in the second level wrapper table that each point to an individual instance of the association class.

21. The system of claim 20, further comprising:
   means for creating, for each new class instance and corresponding new association class instance that reference the new class instance that is created, a new first level wrapper table including a pointer to a new second level wrapper table associated with the association class; and
   means for creating a pointer in the new second level wrapper table that references the new instance of the association class.

22. The system of claim 20, further comprising:
   means for determining, for each new class instance and corresponding new association class instance that is created, all instances of the association class that reference the new class instance;
   means for creating a new first level wrapper table including a pointer to a new second level wrapper table associated with the association class; and
   means for creating a pointer in the new second level wrapper table for each instance of the association class determined by the means for determining.

23. A system for performing association traversals in an object-oriented environment including a plurality of class instances and association instances, comprising:
   means for receiving an association traversal request for a class instance; and
   means for performing an association traversal process based on pointer information reflecting a relationship between the class instance and all association instances that reference the class instance, wherein the means for performing an association traversal process includes:
      means for accessing a first table including a pointer to a second table; and
      means for accessing the second table, using the pointer, to obtain pointers to each association instance that references the class instance.

24. The system of claim 23, wherein the means for performing an association traversal process further includes:
   means for collecting, for each association instance pointed to by the second table, a reference to another class instance that is referenced by the association instance.

25. A system for performing association traversals in an object-oriented environment including a plurality of class instances and association instances, comprising:
   means for receiving an association traversal request for a class instance
   means for obtaining pointers to each association instance that references the class instance from a wrapper table corresponding to the class instance; and
   means for collecting, from the wrapper table, references to other class instances that are referenced by the association instance.

26. A system for performing association traversals in an object-oriented environment including a plurality of class instances and association instances, comprising:
   means for receiving an association traversal request for a class instance; and
   means for obtaining pointers to each association instance that references the class instance from a wrapper table corresponding to the class instance.

27. A computer-readable medium including instructions for performing a method, when executed by a processor, for determining a relationship between objects related to a common information model, the objects including at least a first and second instance and an association that represents an instance of an association class, the method comprising:
   creating, for the first instance, a reverse link that defines a relationship between the first instance and the association, wherein the instance is associated with a first wrapper defining the reverse link, and wherein creating the reverse link includes:
      defining a pointer in a first table of the first wrapper that references a second table; and
      defining a pointer in the second table that references the instance of the association class; and
   determining a relationship between the first and second instances based on the reverse link.

28. The computer-readable medium of claim 27, wherein each association reflects a relationship between a respective association and a corresponding associated object.

29. The computer-readable medium of claim 27, wherein the step of determining a relationship includes:
   collecting a reference reflecting a relationship between the association and the second instance based on the pointer in the second table.

30. A computer-readable medium including instructions for performing a method, when executed by a processor, for maintaining reverse links in a object-oriented environment including class instances and associations, the method comprising:
   for each class instance associated with N instances of an association class that each reference the class instance, wherein N represents an integer value greater than or equal to one:
      (i) creating a first level wrapper table including a pointer to a second level wrapper table associated with the association class; and
      (ii) creating N pointers in the second level wrapper table that each reference an individual instance of the association class.

31. The computer-readable medium of claim 30, wherein the method further comprises:
   for each new class instance and corresponding new association class instance that reference the new class instance that is created:
      (iii) creating a new first level wrapper table including a pointer to a new second level wrapper table associated with the association class; and
      (iv) creating a pointer in the new second level wrapper table that references the new instance of the association class.

32. The computer-readable medium of claim 30, wherein the method further comprises:
   for each new class instance and corresponding new association class instance that is created:

(iii) determining all instances of the association class that reference the new class instance;

(iv) creating a new first level wrapper table including a pointer to a new second level wrapper table associated with the association class; and (v) creating a pointer in the new second level wrapper table for each instance of the association class determined in step (iii).

33. A computer-readable medium including instructions for performing a method, when executed by a processor, for maintaining reverse links in a object-oriented environment including class instances and associations, the method comprising:

for each class instance associated with N association classes that each include at least one association class instance that references the class instance, wherein N represents an integer value greater than or equal to one:
creating a first level wrapper table including N pointers to N second level wrapper tables associated with the association classes.

34. A computer-readable medium including instructions for performing a method, when executed by a processor, for maintaining reverse links in a object-oriented environment including class instances and associations, the method comprising:

for each class instance associated with N instances of a first association class that each reference the class instance, and X instances of a second association class that each reference the class instance, wherein N and X represent integer values greater than or equal to one:

(i) creating a first level wrapper table including:
a first pointer to a second level wrapper table associated with the first association class, and
a second pointer to a second level wrapper table associated with the second association class (ii) creating N pointers, in the second level wrapper table associated with the first association class, that each reference an individual instance of the first association class; and (iii) creating X pointers, in the second level wrapper table associated with the second association class, that each reference an individual instance of the second association class.

35. A computer-readable medium including instructions for performing a method, when executed by a processor, for performing association traversals in an object-oriented environment including a plurality of class instances and association instances, comprising:

receiving an association traversal request for a class instance; and performing an association traversal process based on pointer information reflecting a relationship between the class instance and all association instances that reference the class instance, wherein the association traversal process includes:
accessing a first table including a pointer to a second table; and
accessing the second table, using the pointer, to obtain pointers to each association instance that references the class instance.

36. The computer-readable medium of claim 35, wherein the association traversal process further includes:

for each association instance pointed to by the second table:
collecting a reference to another class instance that is referenced by the association instance.

37. A computer-readable medium including instructions for performing a method, when executed by a processor, for performing association traversals in an object-oriented environment including a plurality of class instances and association instances, comprising:

receiving an association traversal request for a class instance;

obtaining pointers to each association instance that references the class instance from a wrapper table corresponding to the class instance; and collecting, from the wrapper table, references to other class instances that are referenced by the association instance.

38. A computer-readable medium including instructions for performing a method, when executed by a processor, for performing association traversals in an object-oriented environment including a plurality of class instances and association instances, comprising:

receiving an association traversal request for a class instance; and obtaining pointers to each association instance that references the class instance from a wrapper table corresponding to the class instance.

39. In a system comprising a client and a server, a computer-readable medium including instructions for performing a method, when executed by a processor, for performing association traversals performed by the client, comprising:

generating a request for relationship information associated with a selected class instance;

receiving a response including information reflecting a relationship between the selected class instance and other class instances that are referenced by the same association class instances, wherein the response was is generated using pointers defined in a table associated with the selected class instance that reference the common association class instances.

40. In a system comprising a client and a server, a computer-readable medium including instructions for performing a method, when executed by a processor, for performing association traversals performed by the server, comprising;

receiving a request for relationship information associated with a selected class instance;

generating a response including information reflecting a relationship between the selected class instance and other class instances that are referenced by the same association class instances, based on pointers defined in a table associated with the selected class instance that reference the common association class instances.

* * * * *

UNITED STATES PATENT AND TRADEMARK OFFICE
CERTIFICATE OF CORRECTION

PATENT NO. : 7,054,853 B2 Page 1 of 1
APPLICATION NO. : 09/895077
DATED : May 30, 2006
INVENTOR(S) : Johnson et al.

It is certified that error appears in the above-identified patent and that said Letters Patent is hereby corrected as shown below:

In claim 4, column 12, lines 36-37, "a object-oriented" should read --an object-oriented--.

In claim 8, column 13, lines 15-16, "a object-oriented" should read --an object-oriented--.

In claim 14, column 14, line 23, "comprising;" should read --comprising:--.

In claim 20, column 15, lines 6-7, "a object-oriented" should read --an object-oriented--.

In claim 25, column 15, line 64, "class instance" should read --class instance;--.

In claim 30, column 16, line 40, "a object-oriented" should read --an object-oriented--.

In claim 33, column 17, line 11, "a object-oriented" should read --an object-oriented--.

In claim 34, column 17, line 23, "a object-oriented" should read --an object-oriented--.

In claim 34, column 17, line 35, "association class" should read --associated class;--.

In claim 39, column 18, line 41, "response was is" should read --response is--.

In claim 40, column 18, line 50, "comprising;" should read --comprising:--.

Signed and Sealed this

Twenty-ninth Day of August, 2006

JON W. DUDAS
*Director of the United States Patent and Trademark Office*